(12) United States Patent
Hammer et al.

(10) Patent No.: US 6,624,620 B2
(45) Date of Patent: Sep. 23, 2003

(54) POWER SUPPLY FOR A ROTARY PRINTING MACHINE

(75) Inventors: Josef Hammer, Plauen (DE); Detlef Kämpf, Plauen (DE); Rainer Liebold, Neundorf (DE)

(73) Assignee: MAN Roland Druckmaschinen AG, Offenbach am Main (DE)

( * ) Notice: Subject to any disclaimer, the term of this patent is extended or adjusted under 35 U.S.C. 154(b) by 0 days.

(21) Appl. No.: 10/025,677

(22) Filed: Dec. 19, 2001

(65) Prior Publication Data

US 2002/0079877 A1 Jun. 27, 2002

(30) Foreign Application Priority Data

Dec. 22, 2000 (DE) .......................... 100 64 755

(51) Int. Cl.⁷ ................ H02J 1/00; H02J 7/00
(52) U.S. Cl. ........................ 323/350; 307/66
(58) Field of Search ................ 323/350, 282, 323/284, 222, 225; 363/95, 97, 131, 54, 61; 307/66, 31, 32, 33, 11; 101/225

(56) References Cited

U.S. PATENT DOCUMENTS

| | | | | |
|---|---|---|---|---|
| 3,665,495 A | * | 5/1972 | Carter et al. .......... | 307/67 |
| 3,714,452 A | * | 1/1973 | Williamson .......... | 307/86 |
| 4,096,394 A | * | 6/1978 | Ullmann et al. ...... | 307/46 |
| 4,464,615 A | | 8/1984 | Rodi .................. | 318/625 |
| 4,488,107 A | | 12/1984 | Rodi et al. ......... | 323/340 |
| 5,040,180 A | | 8/1991 | Rodi et al. ......... | 371/66 |
| 5,309,834 A | | 5/1994 | Koch ................. | 101/248 |
| 5,809,892 A | * | 9/1998 | Kruger et al. ....... | 101/483 |

FOREIGN PATENT DOCUMENTS

WO    WO 00 69045    11/2000

OTHER PUBLICATIONS

Patent Abstracts of Japan, vol. 1998, No. 08, 10071440, Mar. 1998.
Telecommunications Energy Conference, 1995, Bouwknegt K, "UPS Systems for Remote or Temporary Telecom locations", No Date.
Industrial and Commercial Power Systems Technical Conference, 1993, Lamoree J et al., "Voltage Sag Analysis Case Studies", No Date.
Proceedings of the International Telecommunications Energy Conference, 1991, Harada T et al., "Rationalization of Electricity Operation by Centralized Electricity Monitoring and Control Equipment", No Date.
Elektrotechnische Zeischrift, 1999, Gertkemper C, "Modulare Systemloesung Fuer Lokale Energiequalitaet", No Date.
IEEE Transactions on Industry Applications, 1992, Windhorn A., "A Hybrid Statis/Rotary UPS System", No Date.
Computer Technology Review, 1990, Lengefeld H C, "Rotary UPS–More Reliable For New Computers", No Date.

* cited by examiner

Primary Examiner—Rajnikant B. Patel
(74) Attorney, Agent, or Firm—Cohen, Pontani, Lieberman & Pavane

(57) ABSTRACT

In order to maintain printing machinery in a monitored operating state during line voltage interference and outages, the rotary printing machine is supplied by an interruption-free power supply (USV) having an input side which is connected to the customer mains and an output connected to the printing machine.

7 Claims, 1 Drawing Sheet

POWER SUPPLY FOR A ROTARY PRINTING MACHINE

BACKGROUND OF THE INVENTION

1. Field of the Invention

The invention is directed to a power supply for a rotary printing machine from customer AC system power.

2. Description of the Related Art

The line voltage supplying the operator of a printing machine (customer) is often unstable, Voltage fluctuations and outages occur, as a result of which the printing machine is generally shut down. In current state-of-the-art drive technology, printing machines are outfitted with shaftless main drive systems. When there is no current supplied to drives of this type, rotating cylinders spin down risking web tears and winding which can result damage to the machines. Further, particularly in larger printing machine installations, much time is required for restoring production readiness. With frequent outages, the entire production is even threatened.

SUMMARY OF THE INVENTION

It is the object of the invention to provide an arrangement which maintains the printing machinery in a monitored operating state during line voltage interference and outages.

According to THC invention, a rotary printing machine is supplied with power by an interruption-free power supply (USV) having an input side connected to a customer mains. The interruption-free, power supply makes it possible at least to carry out operations for a production halt defined according to standards.

Depending on the construction of the invention, the printing machine can also be kept in standby operation for the duration of the AC power outage, so that production readiness is provided when voltage is restored. Printing operation can also be ensured for several seconds to several hours.

The power supply according to the invention can be realized and can be designed in an optional manner depending on the type of printing machine and the extent to which the printing machine is outfitted. The standard or basic outfitting of the printing machine need not be altered. Machine downtimes and damage can be prevented and a defined stopping of the machine without torn paper is also ensured in case of power outage.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to

BRIEF DESCRIPTION OF THE DRAWING

The drawing shows a block diagram of the power supply of a rotary printing machine.

DETAILED DESCRIPTION OF THE PRESENTLY PREFERRED EMBODIMENTS

Figure 1:
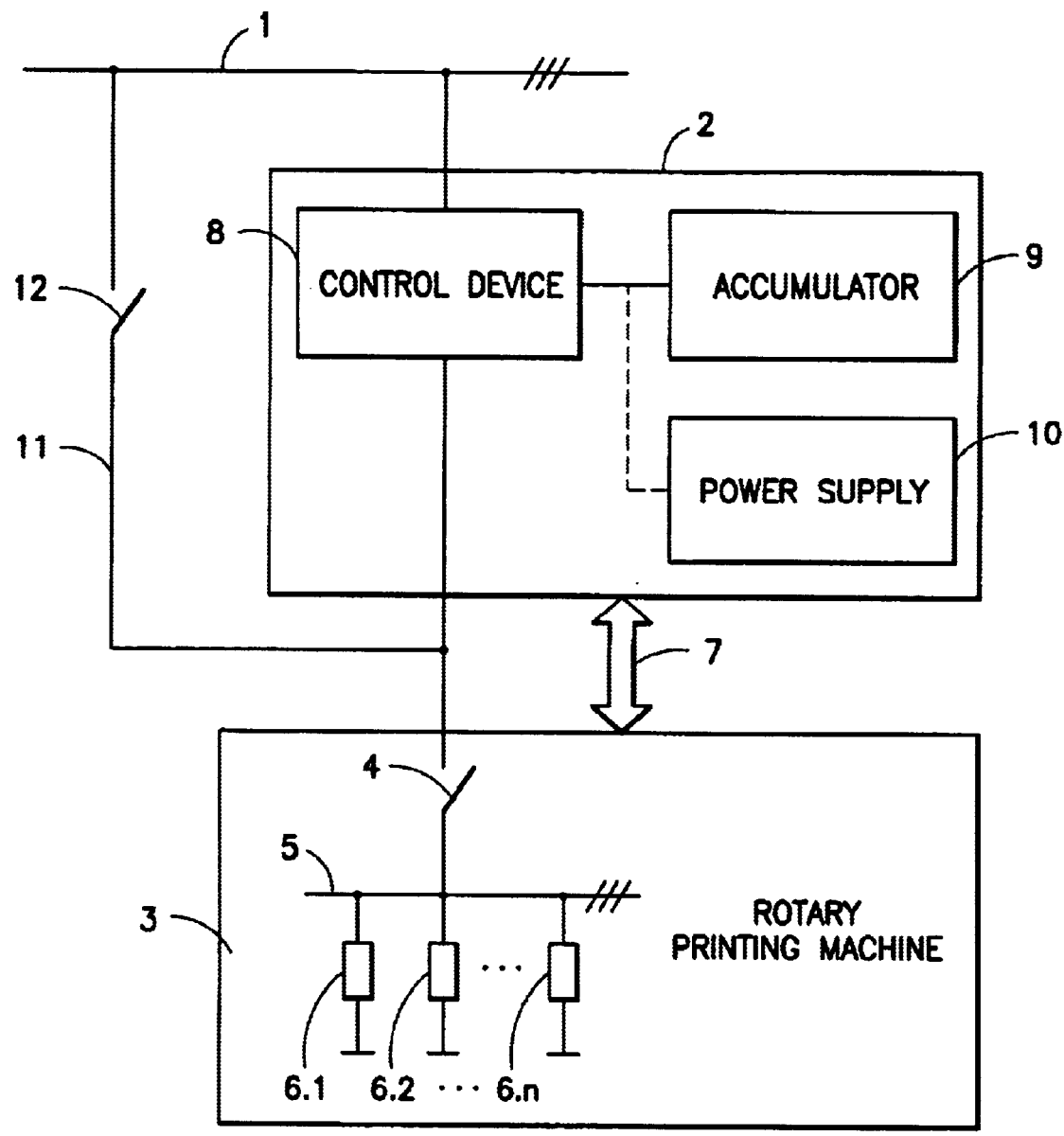

An interruption-free power supply (USV) 2 is connected to customer AC power or mains 1 on the input side and supplies a rotary printing machine 3 on the output side. The drawing shows schematically only the main system switch 4 of the rotary printing machine 3. The current path leads from the main system switch 4 to the system bus bar 5 to which the consumers 6.1, 6.2, ... 6.n of the rotary printing machine 3 are connected. The rotary printing, machine 3 communicates with the USV 2 via a data bus 7.

The USV 2 contains, as essential component parts, a control device 8, an energy accumulator 9 and an emergency power supply 10. The USV 2 can be bridged by means of a line 11, including switch 12, leading from the customer mains 1 to the main system switch 4.

The rotary printing machine 3 is supplied by the customer mains 1 with the intermediary of the USV 2. When the main system switch 4 is tuned on, the consumers 6.1, 6.2, ... 6.n are supplied with power via the system bus bar 5. The USV 2 is interconnected on-line. Off-line operation of the USV is also possible, in which case the USV 2 can be turned on by a suitable circuit without a voltage interruption.

Mains interference, for example, mains voltage fluctuations or an outage or the mains voltage, is signaled by the USV 2 via a data bus 7 of the rotary printing machine. The USV 2 further ensures the power supply of the rotary printing machine via the energy accumulator 9.

The rotary printing machine 3 can respond to the signaled mains disturbance in different ways. For example, in case of total outage of line voltage, a control sequence stored in the control of the rotary printing machine is triggered in order to trigger a production halt which is defined in a standard manner. Subsequently, a control sequence can be initiated which puts the rotary printing machine 3 into standby mode. In this connection, individual consumers 6.1, 6.2, ... 6.n, e.g., cooling units and pumps for operating media can also be turned off. The control sequences are stored in memory-programmable controls, for example.

In another variant the USV 2 is designed to take over the power supply for continuing printing operation. This variant is provided, for example, when desired by an operator of the printing machine for reasons of economy. In this case, the energy accumulator 9 of the USV 2 must have correspondingly large dimensions. The energy power supply 10 which is constructed, for example, as an emergency power unit operated by a diesel engine is turned on when needed.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps ,which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A power supply for a rotary printing machine, said power supply comprising:
    a control in said printing machine in which control sequences for producing a monitored operating state of the rotary printing machine are stored, and an interruption-free power supply having an input side connected to a customer mains and an output side connected to the printing machine, said interruption-free power supply comprising a control device which can sense interference in the customer mains and, when sensed, can signal said control in said printing machine to trigger at least one of said control sequences.

2. A power supply as in claim 1 wherein said interruption-free power supply comprises an energy accumulator for supplying power to the rotary printing machine for at least one of said control sequences when an interference in said customer mains is sensed.

3. A power supply as in claim 2 wherein said interruption-free power supply further comprises an emergency power supply which can be turned on in parallel to the energy accumulator and can provide power for continued printing operation when an interference in said customer mains is sensed.

4. A power supply as in claim 1 wherein said control device can trigger a control sequence which controls a production halt for said rotary printing machine in a predetermined manner.

5. A power supply as in claim 1 wherein said control device can trigger a control sequence which places said rotary printing machine in a standby mode.

6. A power supply as in claim 5 wherein said rotary printing, machine comprises individual consumers which can be turned off in said standby mode.

7. A power supply as in claim 1 wherein said interruption-free power supply comprises means for supplying power to said rotary printing machine when said interference is sensed.

* * * * *